United States Patent [19]
Johnson

[11] 3,912,148
[45] Oct. 14, 1975

[54] COMBINATION WELDING AND BRAZING DEVICE

[75] Inventor: Wayne R. Johnson, Canal Fulton, Ohio

[73] Assignee: The Babcock & Wilcox Company, New York, N.Y.

[22] Filed: Apr. 30, 1974

[21] Appl. No.: 465,715

[52] U.S. Cl................ 228/2.5; 29/157.3 R; 29/401; 228/107; 138/97
[51] Int. Cl.² ......................................... B23K 21/00
[58] Field of Search............ 228/3; 29/470.1, 421 E, 29/401, 157.3 R; 138/97

[56] References Cited
UNITED STATES PATENTS
| | | | |
|---|---|---|---|
| 3,590,877 | 7/1971 | Leopold et al................ | 29/421 E X |
| 3,724,062 | 4/1973 | Cantrell et al..................... | 228/3 X |
| 3,790,060 | 2/1974 | Feiss....................................... | 228/3 |

*Primary Examiner*—Carl E. Hall
*Attorney, Agent, or Firm*—Joseph N. Maquire; John P. Sinnott

[57] ABSTRACT

An illustrative embodiment of the invention is directed to an explosive device for repairing heat exchanger leaks at the junctions between the tubing and the associated tube sheets. Typically, a metal sleeve that is suitable for insertion into the defective or leaking tube has, on the outer surface of one end, a number of recesses or grooves that are filled with brazing metal. The opposite end of the sleeve has a reduced thickness and accommodates a relatively large charge of nitroguanidine. A somewhat smaller expansion charge of PETN extends from the nitroguanidine through the center of the sleeve and past the grooves that are filled with brazing metal to a detonator. When detonated, a part of the thin portion of the sleeve adjacent to the nitroguanidine is welded to the inner surface of the section of the tube that is received within the tube sheet and the other end, that is within the free-standing tube, is pressed into a close brazing contact with the tube.

6 Claims, 1 Drawing Figure

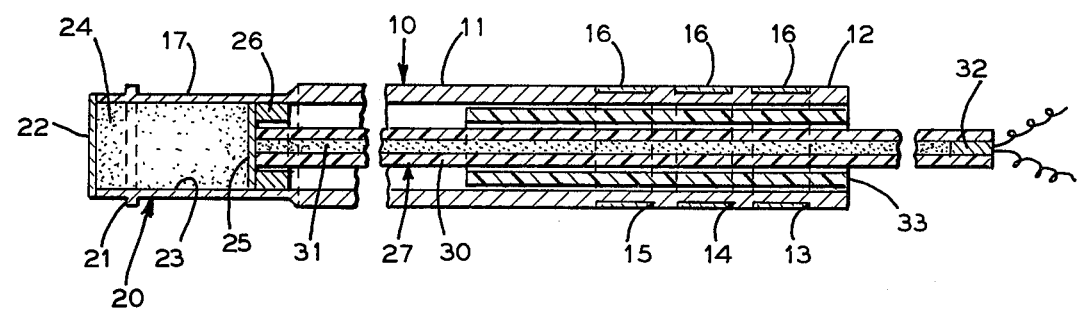

COMBINATION WELDING AND BRAZING DEVICE

BACKGROUND OF THE INVENTION

1. Field of the Invention

This invention relates to repair techniques and, more particularly, to explosive apparatus for repairing leaks in heat exchanger tubing, and the like.

2. Description of the Prior Art

Heat exchangers have achieved a widespread industrial importance. These devices generally have an inlet head and an outlet head that are in fluid communication through a bundle of tubes. The tube bundle is enclosed in a shell that enables one fluid, e.g. water, to flow into contact with the outer surfaces of the tubes in the bundle and to absorb heat from some other fluid that is flowing through the tubes.

These tubes frequently are subject to corrosive attack. This corrosion, for example, can produce holes in the tubing that leads to an undesirable commingling of the two fluids within the heat exchanger. Removing and replacing a defective or leaking tube is expensive not only in terms of labor and materials, but also because of the idle plant time that accumulates while the heat exchanger equipment is out of service. Plugging the leaking tube is another alternative, but it has the critical disadvantage of reducing heat exchanger efficiency.

Various proposals to repair these corroded tubes have been advanced. Some of these suggestions have involved inserting a hollow sleeve into the leaking tube and in some way welding, brazing or otherwise securing the sleeve to the inner surface of the tube in the vicinity of the leak. Welding frequently has involved detonating an explosive charge within the sleeve, causing the sleeve to expand outwardly in a radial direction against the inner surface of the leaking tube with sufficient force to actually weld the expanded sleeve to the adjacent tube surface. This technique is acceptable when it is applied to either of the ends of the defective tube that are anchored in one of the thick steel plates that form the tube sheets. When applied to the free standing portion of the tube in the tube bank, however, the explosive force is of such a nature that there is a substantial risk of bursting the sleeve and the tube.

Within the tube bank, a less powerful explosive charge can be used to expand the sleeve and an interposed brazing metal in a radially outward direction into a sufficiently close proximity with the inner surface of the tube to enable the sleeve and the tube subsequently to be brazed together into a leak-tight fit. The sleeve and the tube are brazed together through the application of sufficient heat to cause the interposed brazing metal to flow and wet both of the opposed surfaces. On removing the heat source and cooling, the brazing metal solidifies into a sturdy joint that binds the sleeve to the adjacent portion of the hitherto leaking tube.

It has been found that this brazing technique is inappropriate to tube leaks within the tube sheet. The heat loss through the mass of metal in the portion of the tube sheet that surrounds the tube under repair is so great that, in most instances, the brazing metal will not liquify.

Thus, explosive welding is suitable to repair leaks within the tube sheet and the foregoing brazing process is best adapted to use within the tube bank. It appears, however, that in many heat exchangers the most severe corrosion problems occur at the junction between the tubes and the tube sheet. To make matters even more difficult, the actual leak location—within the tube sheet or in the free standing portion of the tube that is immediately above the tube sheet—is very difficult to identify.

Accordingly, there is a need to provide some means for repairing heat exchanger tubes that have developed defects within or adjacent to the tube sheet.

SUMMARY OF THE INVENTION

These difficulties are overcome, to a large extent, through a device that embodies principles of the invention. Illustratively, a combination sleeve that has a weld portion and a braze portion, each with a suitable explosive charge and prepared outer surface will satisfy the need to effect tube repairs in the vicinity of the tube sheet.

More specifically, a typical sleeve that has these features comprises an Inconel (Inconel 600 has a typical composition, by weight, of 76.5 parts nickel; 14.5 parts chromium; 8.2 parts iron; 0.19 parts copper; 0.26 parts silicon; 0.007 parts sulfur; 0.25 parts manganese; and 0.03 parts carbon. Preferably, the manganese concentration should be reduced to 0.1 part by weight or less and cobalt, although not shown in the foreoing illustrative composition, also should be avoided. Naturally, trace amounts of other elements also can be present.) tube of about one half inch maximum outside diameter. The weldable portion of the sleeve that is adjacent to one end has a significantly reduced thickness and a relatively large explosive charge of nitroguanidine packed within the center of the sleeve. The nitroguanidine charge extends through the sleeve a distance that is equal to the length of the prepared weld surface. Preferably, an annular flange protrudes from the outer surface of the sleeve's reduced thickness portion. This flange separates the weld surface from the end of the sleeve.

A thin disc of PETN (PETN is an acronym for pentaerythritol tetranitrate, an explosive compound.) explosive in the sleeve terminates the nitroguanidine charge. Within the sleeve, moreover, the PETN disc and the nitroguanidine charge are held in place by means of a ring of balsa wood. A flexible polyethylene plastic tube, or "expansion cord," that contains a central fill of PETN abuts the PETN disc and passes through the central aperture in the balsa wood ring as well as the balance of the sleeve to an electrically activated detonator. Although the expansion cord can be cut off flush with the end of the sleeve and the detonator implanted in the center of the plastic tube, in many instances it is preferable to carry the expansion cord through the entire length of the tube that is undergoing repair and out of the heat exchanger before inserting the detonator.

Within the sleeve, the expansion cord also passes through a hollow cylinder of wood or plastic. This hollow cylinder serves to transmit the force of the exploding expansion cord to the surrounding Inconel sleeve. The force causes the adjacent sleeve portion to expand outwardly in a radial direction and press the outer surface of the sleeve directly against the opposing inner surface of the corroded or defective heat exchanger tube. The explosive force, in this case, is only sufficient to bring the sleeve into intimate contact with the tube and will not rupture or burst through the tube and sleeve combination.

The brazing portion of the sleeve is prepared by machining one or more circumferential grooves in the outside surface of the sleeve near the sleeve end that is opposite to the weld surface sleeve end. The grooves are filled with a suitable brazing alloy which is, in effect, brazed to the grooved surfaces. The outside of the sleeve then is machined to final dimensions to have a depth of integral brazing metal that is about 0.012 to 0.015 inch.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The sole FIGURE of the drawing shows, in full section, a typical sleeve that characterizes features of the invention.

DESCRIPTION OF THE PREFERRED EMBODIMENTS

For a more complete appreciation of the invention, attention is invited to the FIGURE of the drawing which shows a typical device for repairing a heat exchanger tube or other structure. A tubular sleeve 10 that is about 5 inches long and has a maximum outside diameter of about 0.545 inch is made of Inconel or some other suitable material. The sleeve has an outer surface 11 with a maximum diameter portion 12 prepared for brazing. The portion 12 has three circumferential grooves 13, 14, and 15 each of about one half inch in length which are machined into the surface 11 of the sleeve 10 to a depth that is sufficient to provide a recess which is 0.012 to 0.015 inch deep when the surface 11 is machine finished.

Before machine finishing the portion 12, the circumferential grooves 13, 14, and 15 are filled with brazing metal 16. Although the primary criterion for the brazing metal 16 that fills the grooves 13, 14, and 15 is the ability of the metal 16 to produce an acceptable bond between the material of the sleeve 10 and the material to which the sleeve is to be joined (not shown), it has been found for many purposes that AWSB Ag — 1a brazing metal is suitable. (AWSB Ag — 1a brazing filler metal is an alloy that has a nominal composition of 50% silver, 15.5% copper, 16.5% zince, 18% cadmium. The brazing temperature range for this composition is 1,175° to 1,400°F.)

In order to fill the grooves 13, 14, and 15 with the brazing metal 16, the metal is applied to the grooves as a 1/16 inch diameter wire. The wire is manually brazed in place with an oxy-acetylene torch and a paste flux. After the metal 16 is brazed into place within the grooves, the sleeve 10 is machined finished to the specified inside diameter and outside diameter thickness.

As a part of this machine finishing, the sleeve 10 also is provided with a weld surface 17. As shown in the drawing, the surface 17 has a smaller outside diameter than the maximum diameter portion 12 of the sleeve. A sleeve wall thickness of 0.035 inch has been found suitable in many instances for the purpose of this invention. The length of overall reduced diameter portion 20 in the illustrative example of the invention, moreover, is about one inch. Thus, the weld surface 17 is a circumferential cylinder about three-fourths inch long that is spaced one-fourth inch inwardly from the extreme end of the sleeve 10.

An annular flange 21 separates the weld surface 17 from the final quarter inch section of the sleeve 10. A diameter of 0.545 inch for the flange 21 has produced acceptable results when used with the illustrative embodiment of the invention under consideration. The flange 21, although not necessarily participating in the welding process that will be described subsequently in more complete detail, nevertheless does engage and press into the surface of the adjacent portion of the heat exchanger tube (not shown) that is undergoing repair.

The end of the sleeve 10 that has the reduced diameter portion 20 is closed by means of a paper, cardboard, masking tape or other suitable plug 22. The plug 22 is glued to the end of the sleeve 10 in order to form a closure for part of a chamber 23 within the sleeve 10 that holds a charge of nitroguanidine 24. In this respect, it has been found that a 0.7 gram per cubic centimeter charge of nitroguanidine powder, packed as described within the chamber 23 which has an illustrative diameter of about 0.444 inch, will produce acceptable welds. This quantity of explosive is equal to 0.68 grams of nitroguanidine per centimeter of chamber length.

Within the sleeve 10, the nitroguanidine charge 24 terminates in, and the chamber 23 is completed by a thin PETN disc 25. As shown, the perimeter of the disc 25 is generally coextensive with the inside diameter of the sleeve 10. A ring 26 of balsa wood, or the like, that is also coextensive with the inside diameter of the sleeve 10 is lodged against the PETN disc and holds the disc and nitroguanidine charge in place.

One end of a PETN filled expansion cord 27 is pressed against the PETN disc 25 and is seated within the balsa wood ring 26. The expansion cord 27 is a commercially available combination of a flexible polyethylene tube 30 and a central fill 31 of PETN. The PETN fill 31, in an amount of 11 grains per foot of the tubing 30, is suitable for use in connection with the illustrative example of the invention that is under consideration. This explosive concentration is, of course, significantly less powerful than the nitroguanidine charge 24 in the chamber 23. As shown in the drawing, the expansion cord 27 is carried through the balance of the sleeve 10 in general alignment with the sleeve's cylindrical axis. The cord 27, moreover, extends from some suitable distance beyond the brazing end of the sleeve to a suitably safe location, e.g. outside of the heat exchanger structure. This extended end of the cord 27 terminates in an electrically activated detonator 32 that is pressed into the center of the polyethylene tube 30.

Within the sleeve 10 a hollow cylinder 33 of wood, polyethylene or some other acceptable material is fitted between the inner sleeve surface and the centrally disposed expansion cord 27. The hollow cylinder 33 serves to transmit the explosive force from the expansion cord 27 to the sleeve 10 in order to enable the sleeve to expand in a radially outward direction and to press directly against the inner surface of the tube that is being repaired.

In operation, the heat exchanger (not shown) is emptied of all fluids, the inner surface of the defective tube is wire brushed and honed clean, and the heat exchanger then is filled with an atmosphere which is chemically inert with respect to the materials in the sleeve 10, the brazing metal 16 and the heat exchanger. The sleeve 10, meanwhile, is inserted into the end of the defective tube. In this circumstance, the weld surface 17 is lodged within the portion of the tube that is surrounded by the tube sheet (not shown) and the brazing metal 16 is within the free standing portion of the tube in the tube bank. The expansion cord 27 is unspooled to some suitable location, cut-off and the detonator 32 is inserted into the center of the cut-off end of the cord.

Upon detonation, the expansion cord 27 causes the maximum diameter portion 12 of the sleeve 10 and the associated brazing metal 16 to expand into an intimate contact with the inner surface of the tube. The force of the explosion in the maximum diameter portion 12 is not sufficient to produce a rupture in either the sleeve 10 or the adjacent portion of the heat exchanger tube. The explosion, in fact, causes the maximum diameter portion to expand about 0.007 inch.

Within the tube sheet (not shown) the surface 17 is physically welded to the inner surface of heat exchanger tube undergoing repair. The flange 21 also is pressed into the metal of the tube as a result of the forces generated in the nitroguanidine charge 24. During the explosion, the plug 22 bursts and thus, to some extent, alleviates the pressures that are generated.

The repair is completed by applying an acetone swab to clean the interior of the now expanded sleeve. A cartridge type electrical resistance heater is inserted into the sleeve in order to supply the necessary heat to cause the brazing metal 16 to liquify and wet the adjacent inner surface of the heat exchanger tube. In this respect, temperatures in the range between 1,377°F to 1,750°F have been found to produce satisfactory liquefaction and subsequent bonding on removal of the heater and solidification of the brazing metal.

To restore the heat exchanger to operation, debris is removed from the sleeve and the inert gas is flushed from the system.

Clearly, the principles of this invention are not limited in application to heat exchanger tube repair but are applicable to almost any situation in which welded and brazed joints must be provided in close proximity to each other.

The embodiments of the invention in which an exclusive property or privilege is claimed are defined as follows:

1. A device for brazing and welding in close proximity to each other comprising, a sleeve having two ends on opposite extremities thereof and a hollow center, a surface on one of said sleeve ends for use in establishing the weld, a surface on the other of said sleeve ends for use in establishing the braze, a brazing material on the brazing end, an explosive charge within said sleeve and adjacent to the weld surface, and a less powerful explosive charge within said sleeve and adjacent to the brazing surface, said charges being effective upon detonation to create a weld including the weld surface and to position the brazing surface in a condition to be brazed.

2. A device according to claim 1 wherein said less powerful explosive charge further comprises an expansion cord that has a flexible tube in general alignment with the center of said sleeve and a fill of PETN within said flexible tube.

3. A device according to claim 1 wherein said explosive charge adjacent to said weld surface further comprises nitroguanidine packed within a chamber.

4. A device according to claim 1 wherein said surface for use in establishing the braze further comprises at least one groove formed in the sleeve, and brazing metal in said groove.

5. A device according to claim 1 wherein said surface for use in establishing the weld further comprises a thinner portion of said sleeve than the thickness of said sleeve end for establishing the braze.

6. A device according to claim 2 wherein said expansion cord and said sleeve are separated by an interposed layer of material for transmitting explosive forces from said expansion cord to said sleeve.

* * * * *